(12) United States Patent
Weber (10) Patent No.: US 6,431,524 B1
(45) Date of Patent: Aug. 13, 2002

(54) WIRE OR CABLE PULLING APPARATUS

(75) Inventor: Thilo Weber, Neenah, WI (US)

(73) Assignee: Rothenberger USA Inc., Monterey Park, CA (US)

( * ) Notice: Subject to any disclaimer, the term of this patent is extended or adjusted under 35 U.S.C. 154(b) by 0 days.

(21) Appl. No.: 09/864,528

(22) Filed: May 23, 2001

(51) Int. Cl.[7] .............................................. H02G 1/08
(52) U.S. Cl. ............................................ 254/134.3 FT
(58) Field of Search ................. 254/134.3 R, 134.3 FT, 254/326, 134.3 PA, 134.5

(56) References Cited

U.S. PATENT DOCUMENTS

| | | | |
|---|---|---|---|
| 3,072,382 A | 1/1963 | Jones | |
| 3,190,616 A | 6/1965 | Oleson | |
| 3,291,449 A | 12/1966 | Hughes | |
| 3,809,366 A | 5/1974 | Crees | |
| 3,968,952 A | * 7/1976 | Newell | ................ 254/134.3 R |
| 4,456,225 A | 6/1984 | Lucas | |
| 4,497,470 A | 2/1985 | Carter et al. | |
| 5,149,056 A | 9/1992 | Jones | |
| 5,464,193 A | 11/1995 | Wrate | |
| 5,645,265 A | * 7/1997 | Shu | ................... 254/134.3 FT |
| 5,984,273 A | 11/1999 | Ray | |
| 6,003,842 A | 12/1999 | Hug | |
| 6,073,917 A | 6/2000 | Plummer | |
| 6,135,422 A | * 10/2000 | Thomas | ..................... 254/423 |
| 6,193,218 B1 | * 2/2001 | Philyaw | ..................... 254/326 |
| 6,286,815 B1 | * 9/2001 | Ray | .................... 254/134.3 R |

\* cited by examiner

Primary Examiner—Joseph J. Hail, III
Assistant Examiner—Lee Wilson
(74) Attorney, Agent, or Firm—William W. Haefliger

(57) ABSTRACT

Wire or cable pulling apparatus, comprising in combination a stand including an upright pedestal and a base supporting the pedestal; a frame mounted on the pedestal; a rotary axle supported by the frame, and a wire or cable pulling capstan carried by the axle, there also being a coupler associated with the axle for coupling an electrically powered driving tool in rotary driving relation with the axle and capstan; a boom having one end carried by the frame, and an idler carried proximate the opposite end of the boom, for entrainment by the cable or wire being pulled in response to capstan rotation when the boom is in operating position, extending at a first angle relative to the frame, the boom having a stored position in which the boom extends at a second angle relative to the frame.

13 Claims, 11 Drawing Sheets

WIRE OR CABLE PULLING APPARATUS

BACKGROUND OF THE INVENTION

This invention relates generally to apparatus for pulling wire or cable through conduits, such as electrical conduits, and more particularly concerns use of power tools for such pulling.

There is need for improvements in apparatus useful for such purposes, and in particular for efficient accommodation of electrically driven pipe threading drives to equipment for pulling wire or cable through conduit. Pipe threading drives employ a power driven annulus or ring that fits over pipe; and no way was known to use such a drive for wire or cable pulling, and unusual advantages deriving from such use were unknown.

SUMMARY OF THE INVENTION

It is one major object of the invention to provide improvements in apparatus as referred to. Basically, the improved apparatus includes:
 a) a stand including an upright pedestal, and a base supporting the pedestal,
 b) a frame mounted on the pedestal,
 c) a rotary axle supported by the frame, and a wire or cable pulling capstan carried by the axle, there also being a coupler associated with the axle for coupling an electrically powered driving tool, such as a pipe threader drive, in rotary driving relation with the axle and capstan,
 d) a boom having one end portion carried by the frame, and an idler carried by the boom, for entrainment by the cable or wire being pulled in response to capstan rotation when the boom is in operating position, extending at a first angle relative to the frame,
 e) the boom having a stored position in which the boom extends at a second angle relative to the frame.

It is another object of the invention to provide an angular position adjustment associated with the boom, whereby the idler can be adjustably positioned angularly, relative to the capstan, enabling pulling of the wire or cable from the idler, in different directions. That adjustment may advantageously include telescopically interfitting boom members one of which carries the idler, and the other of which is carried by the frame; and locking parts associated with those members to lock them in selected adjusted positions.

A further object includes provision of a boom captivating device carried by one of the following:
 i) the base
 ii) the pedestal.
The boom itself advantageously may include adjustable members, one of which is adjustable into captivation by that device.

A further object includes provision for accommodation of the driving tool to the frame by provision of a stop on the frame to be engaged by the tool in response to torque transmission by the tool to the capstan, during wire and cable pulling.

An ON-OFF switch may be provided remote from the installed tool, that switch being engagable as by an operator's foot to shift the tool between ON-OFF positions, whereby the operator's hands are free for handling cable or wire spooling off the capstan.

These and other objects and advantages of the invention, as well as the details of an illustrative embodiment, will be more fully understood from the following specification and drawings, in which:

DRAWING DESCRIPTION

FIG. 14 is a top plan view of the apparatus as seen in FIG. 13.

DETAILED DESCRIPTION

Referring to FIGS. 1–5, and FIGS. 11–14, the apparatus includes a stand 10 having an upright pedestal 11 and a base 12 supporting the lower end of the pedestal. A frame 13 is mounted on the pedestal, and a transverse rotary axle 14 is supported by the frame, as via bearings at 15 and 16.

A wire or cable pulling capstan 17 is carried by the axle to be rotated by the axle, at one side of the frame. A coupler 18, such as a drum, is also carried by the axle, at the opposite side of the frame, so that when the coupler is rotated, the axle and capstan are also rotated.

Figure 8:
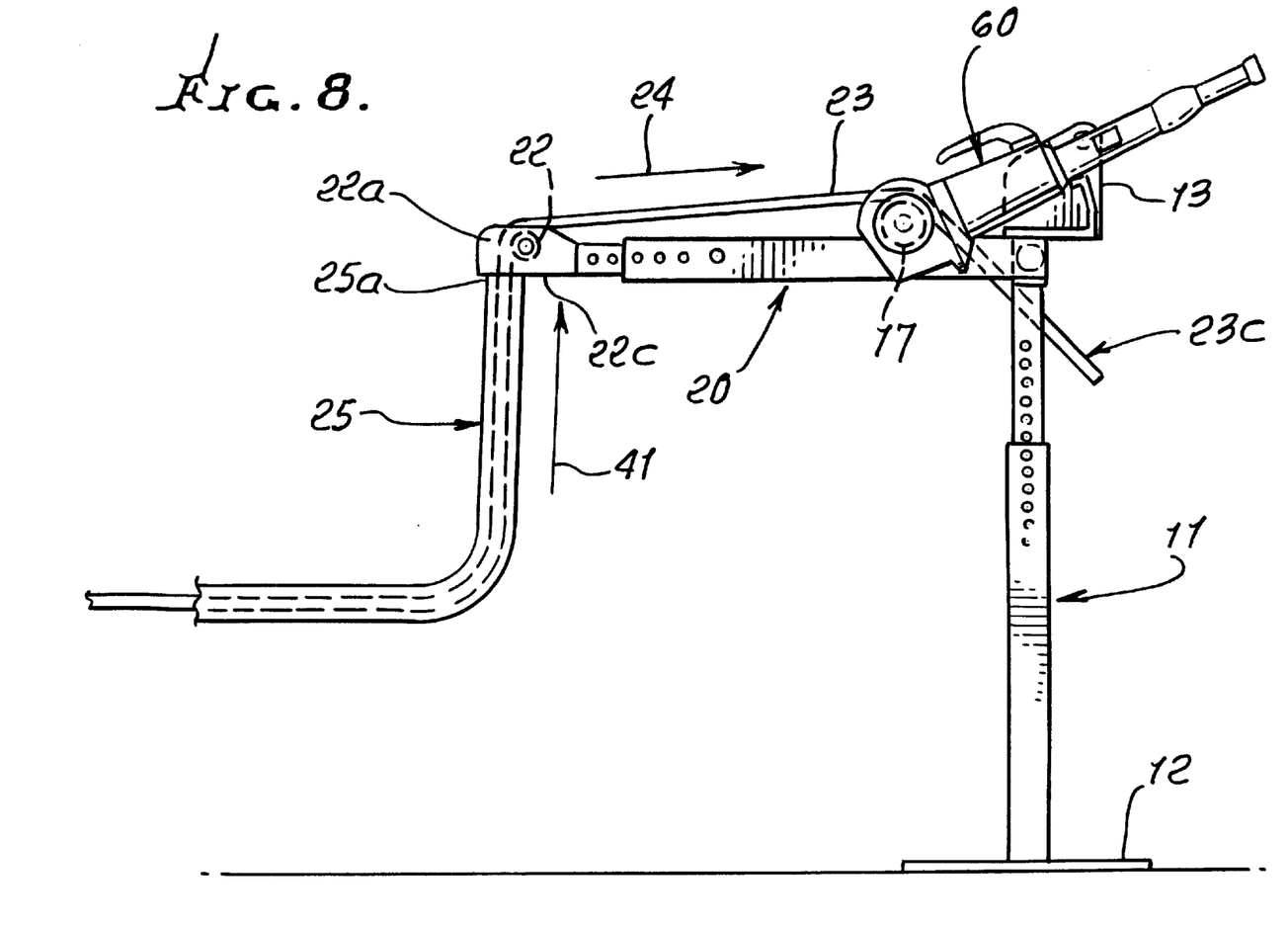
FIG. 8 is a left side elevation view of the apparatus, showing frame orientation for pulling of wire or cable from a conduit, as from another direction.

A boom 20 projects away from the frame and is pivotally attached to the frame at 20a in laterally offset relation to the pedestal top. Bearings 15 and 16 may be carried by the boom, whereby the axle is carried by the boom and the frame. An idler 22 is carried, as by flanges 22, proximate the opposite or distal end portion 20 of the boom, for entrainment by a wire or cable 23 as seen in FIG. 8. The wire or cable is shown as being pulled in direction 24, after having exited the end 25a of the conduit 25, which is shown as abutting the edges 22c of the flanges at distal end. From that location, the wire or cable is pulled around the idler, and toward and around the rotating capstan 17. Several turns of the wire or cable around the capstan serve to provide driving friction between the capstan 17 and the wire or cable wrappings. The operator may grip and pull the wire or cable at 23c, spooling off the capstan.

Figure 7:
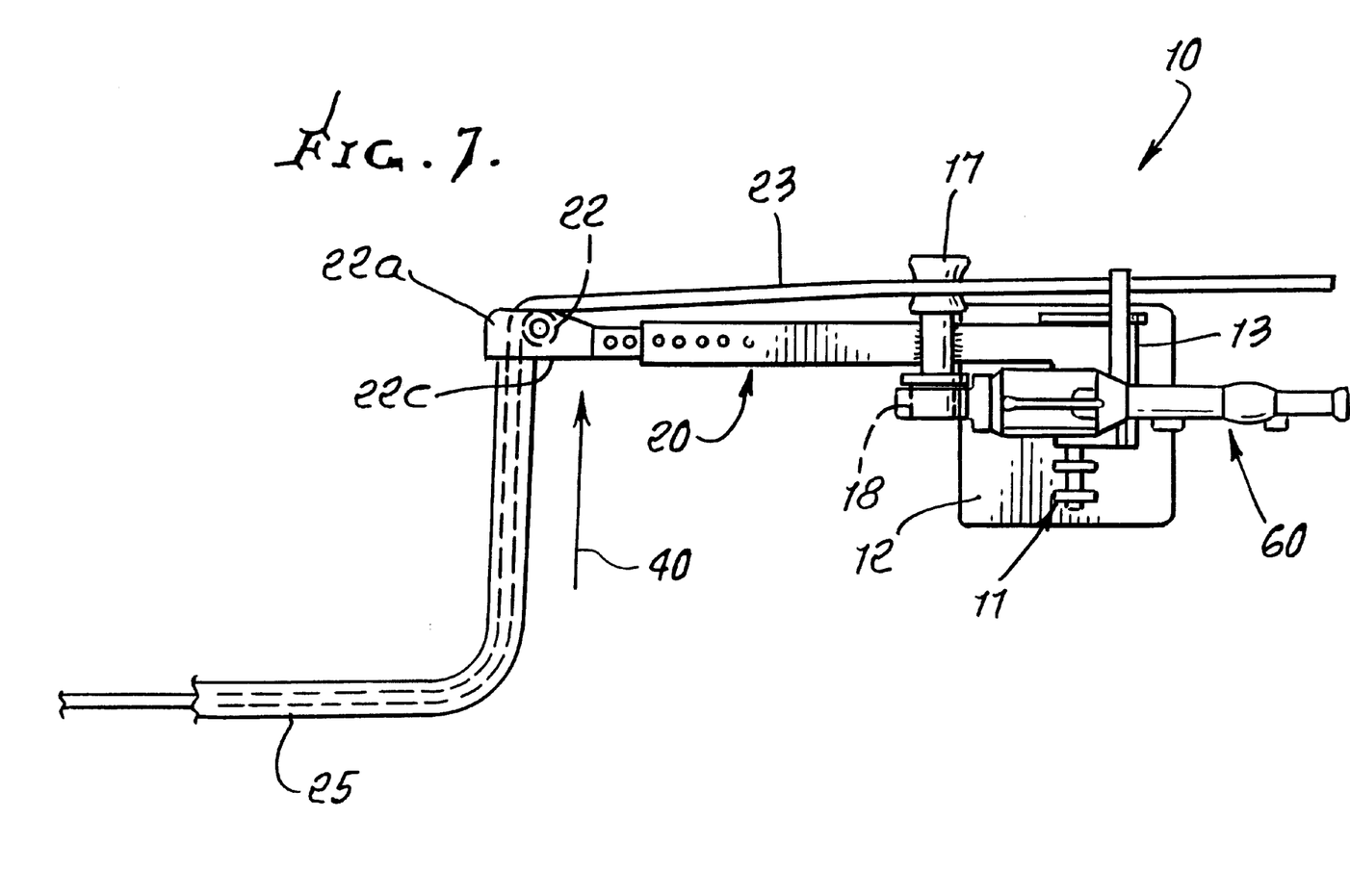
FIG. 7 is a top plan view showing frame orientation for pulling of wire or cable from a conduit, as from one direction.

An angular position adjustment, associated with the boom, is provided, whereby the idler can be adjustably positioned angularly, relative to the capstan, to facilitate different directional presentations of the idler to the wire or cable being pulled as from conduit, thereby accommodating to conduit ends that may be presented up, down, leftwardly or rightwardly. FIGS. 7–10 illustrate possible different angular presentations. In FIG. 7 the wire or cable is being pulled directionally from the left (see arrow 40); in FIG. 8, the boom end portion 20b has been rotated 90° (relative to the pedestal) to enable pulling of the wire or cable from below (see arrow 41); in FIG. 10 the boom end portion 20b has been rotated 90° to the right (as measured from FIG. 7 position), to enable pulling of the wire or cable from the right (see arrow 42); and in FIG. 9 the entire boom has been rotated 180° (as measured from FIG. 7 position) to enable pulling of the wire or cable from above (see arrow 43).

Figure 9:
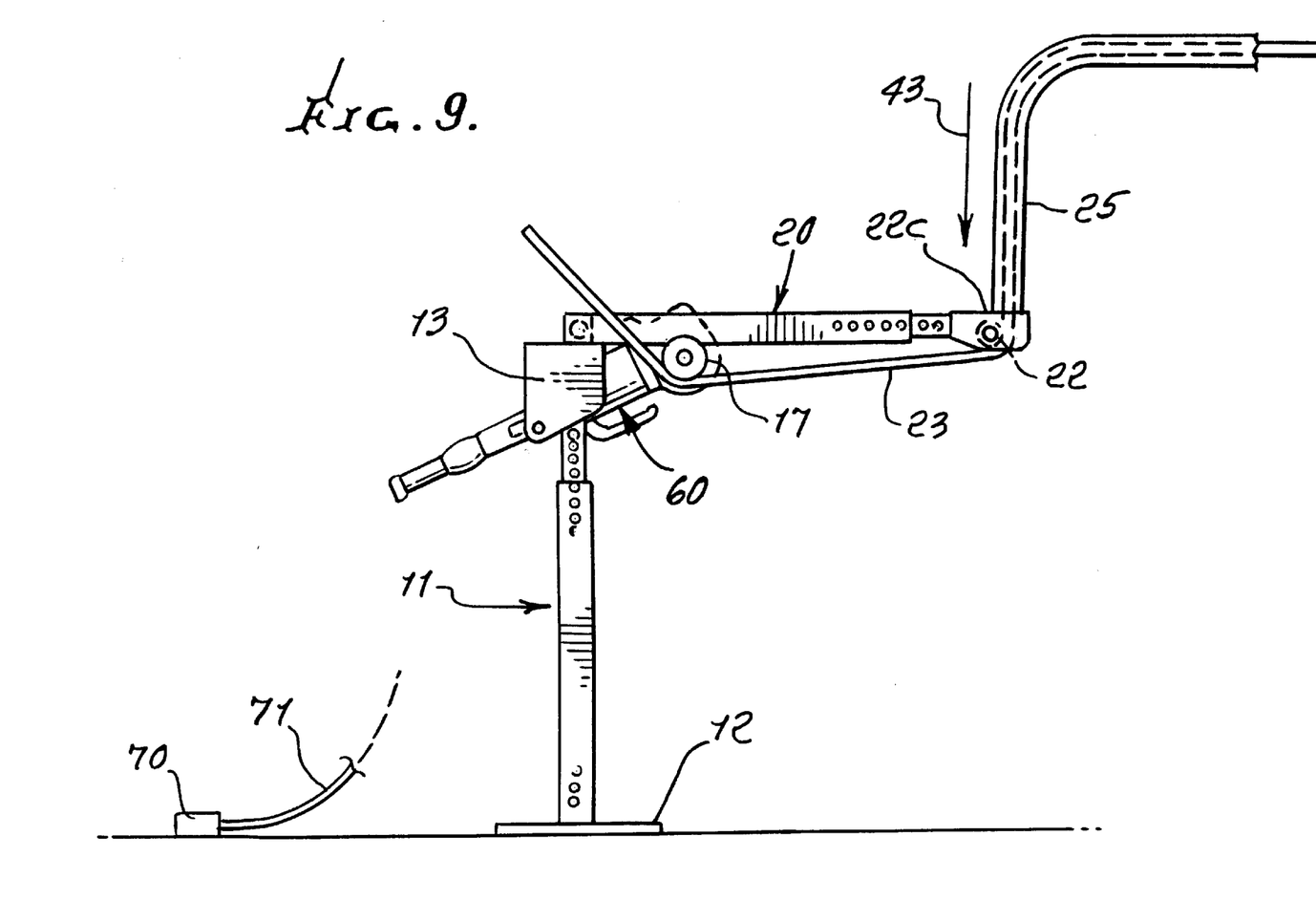
FIG. 9 is a right side elevation view of the apparatus, showing frame orientation for pulling a wire or cable from a conduit, from yet another direction.
Figure 10:
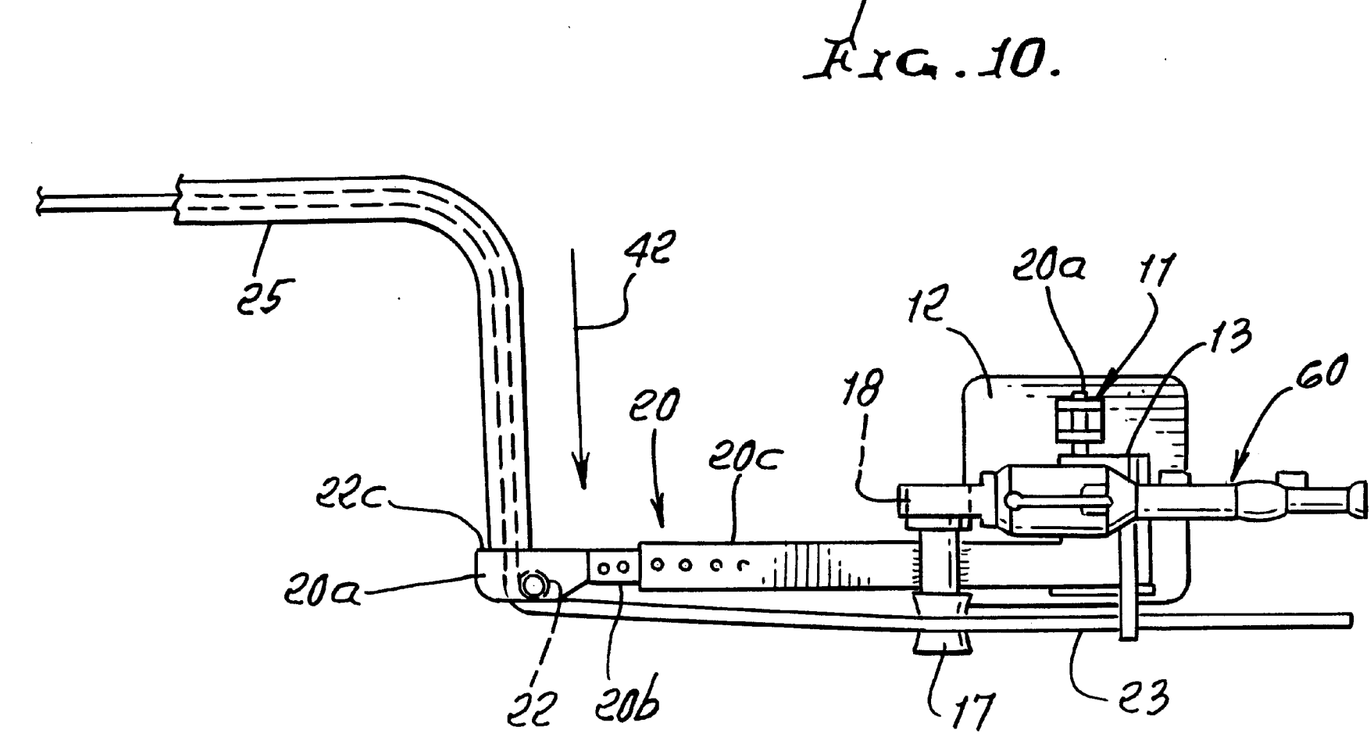
FIG. 10 is a plan view showing frame orientation during pulling from an additional direction.

In these regards, the boom end portion 20b is shown to have square cross section, and to endwise slidably fit into larger square cross section and open portion or section 20c of the boom. Matching holes 32 and 32a in 20b and 20c in various quarter turn positions enable pin connection of the portions or sections 20b and 20c in selected endwise shifted positions. Also, the holes extend in lengthwise separate rows, to enable telescopic extension of the boom to desired length. In FIG. 9, the boom end, proximate the pedestal, has been detached from a pivot extending transversely from the top of the pedestal, and rotated 180°, and reattached. The boom 20 is swivel connected to the top of the pedestal, to rotate angularly about a vertical axis.

The pedestal 11 also includes telescopically interfitting members 46 and 47, one of which is carried by base 12, and the other of which supports or carries the frame 13. Those members also have a matching series of holes 33 and 33a (see FIG. 4) located lengthwise of the members to permit lengthwise adjustment of the pedestal. A pin 48 interfits selected matching or registering holes to hold the members in selected length positions.

Figure 11:
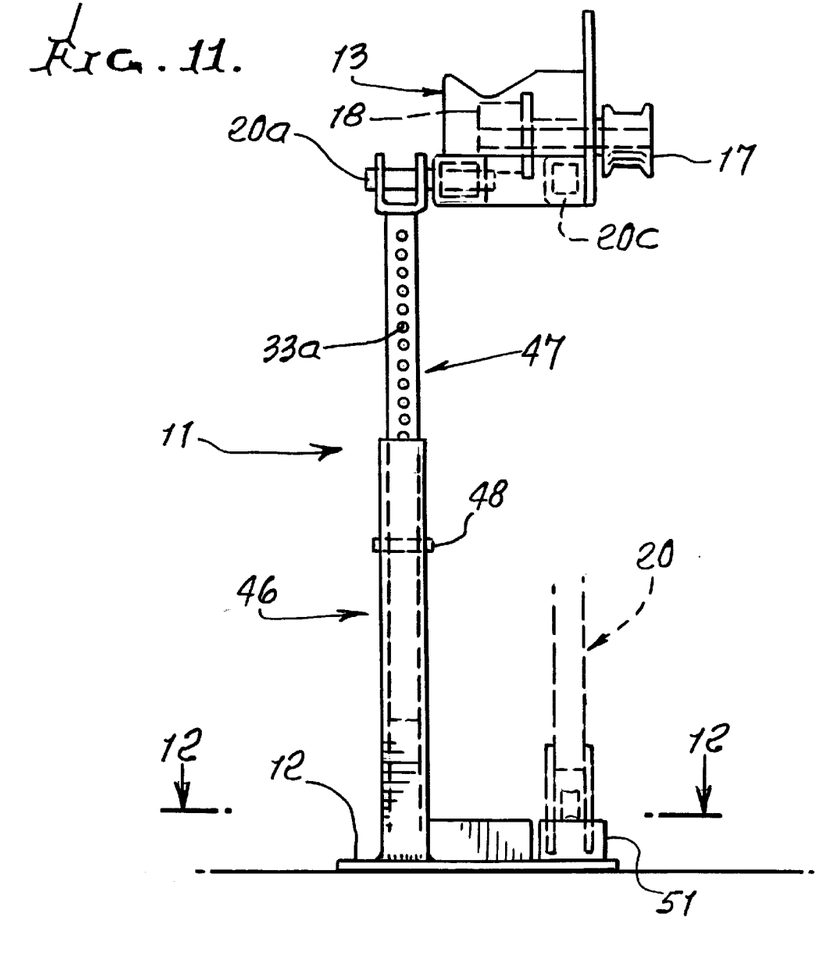
FIG. 11 is an end elevation of similar apparatus, showing further details, including boom end captivation.
Figure 12:
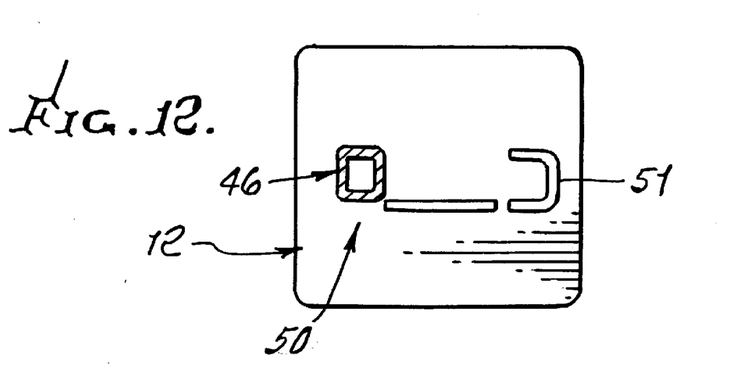
FIG. 12 is a plan view taken in section on lines 12—12 of FIG. 11.
Figure 13:
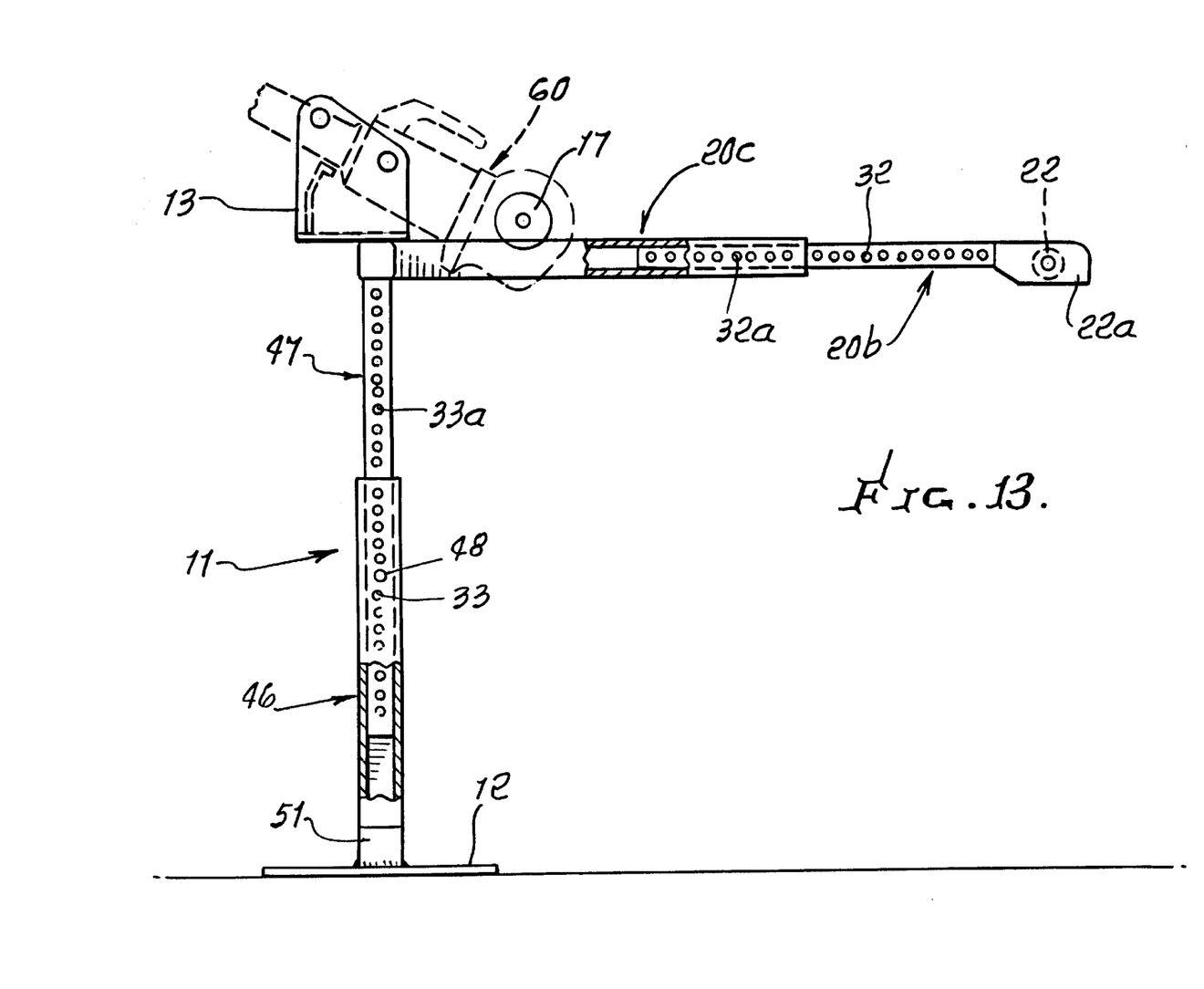
FIG. 13 is a side elevational view of the apparatus seen in FIG. 11.
Figure 19:
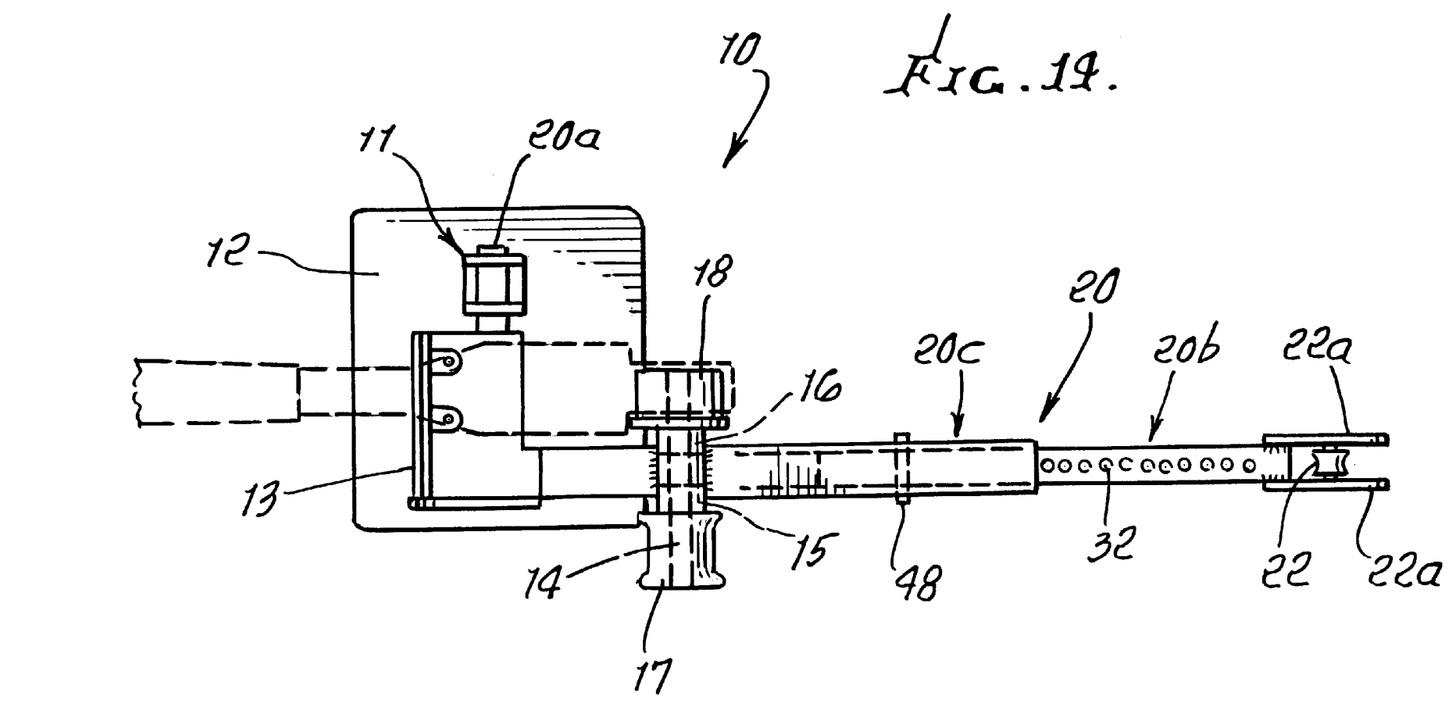

A captivating or retention device 50 is provided on the base as seen in FIGS. 11 and 12 to captivate the flanged lower end of the boom, as during transportation of the collapsed apparatus. See C-shaped retainer 51 upstanding from 12. The captivating device may be located on the pedestal.

Figure 1:
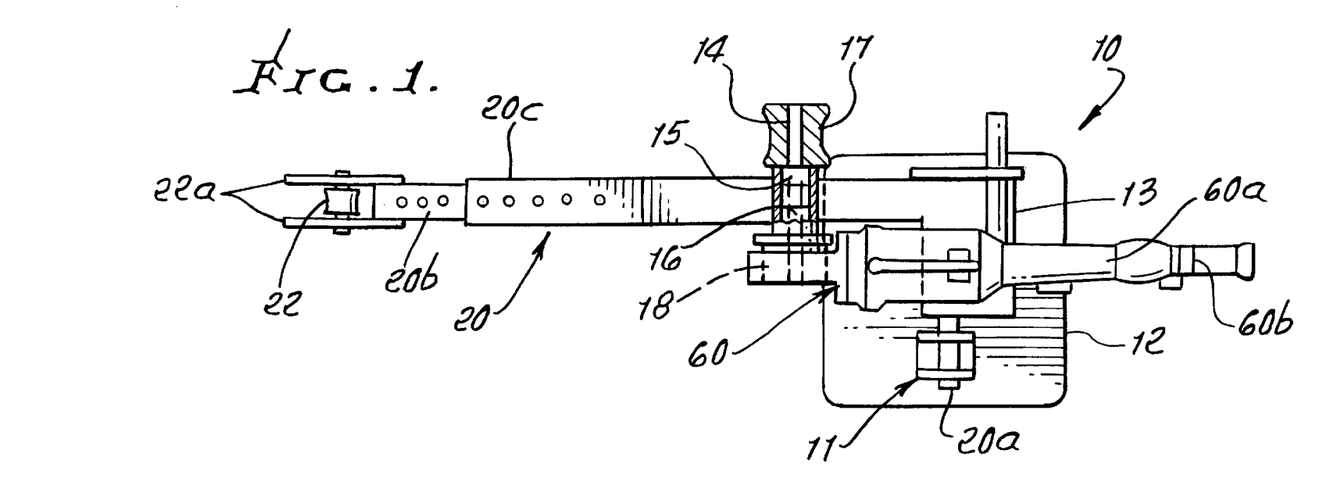
FIG. 1 is a top plan view of apparatus incorporating the invention.
Figures 2, 3:
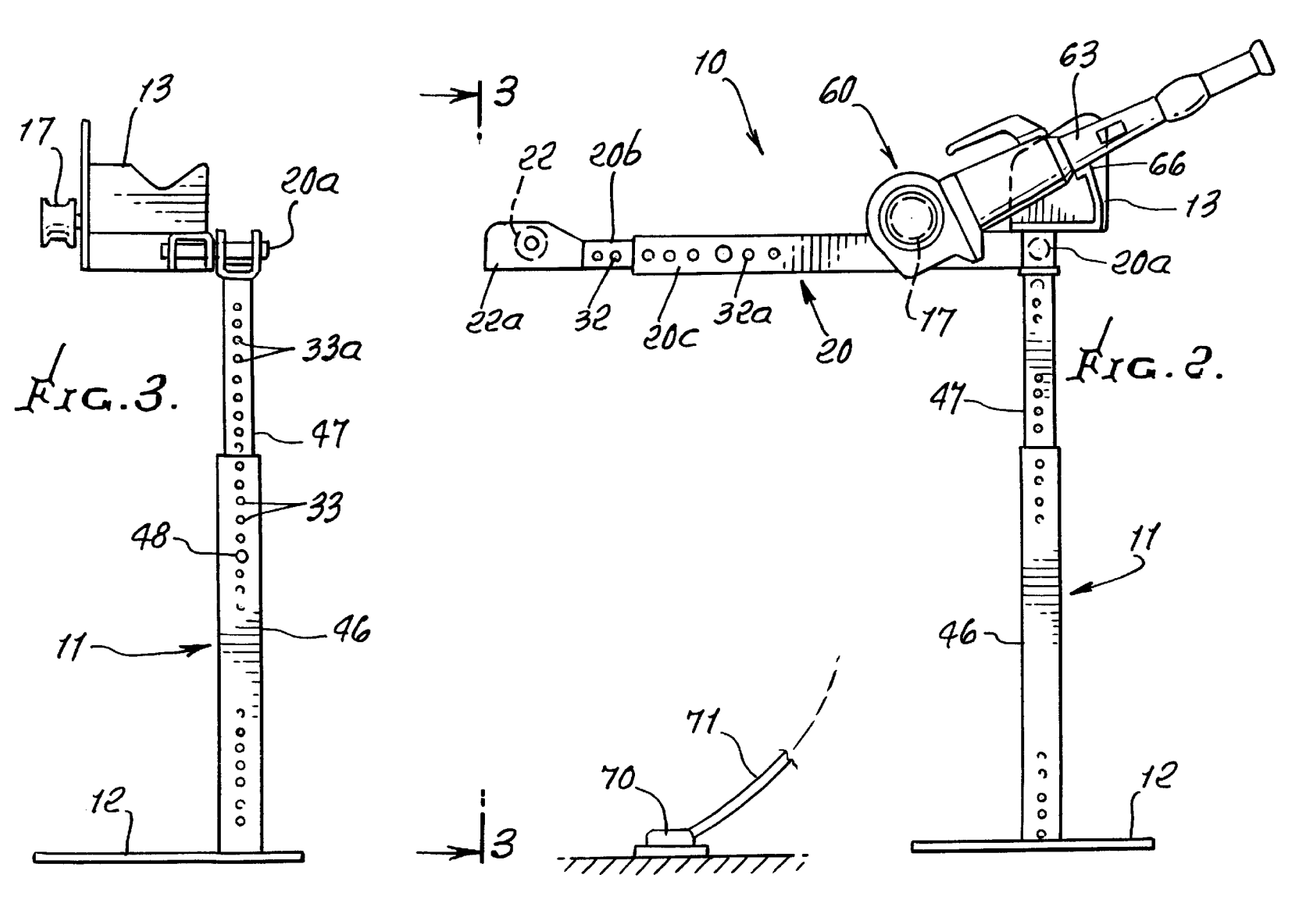
FIG. 2 is a side elevational view of the FIG. 1 apparatus.
FIG. 3 is an end elevational view taken on lines 3—3 of FIG. 2.
Figure 4:
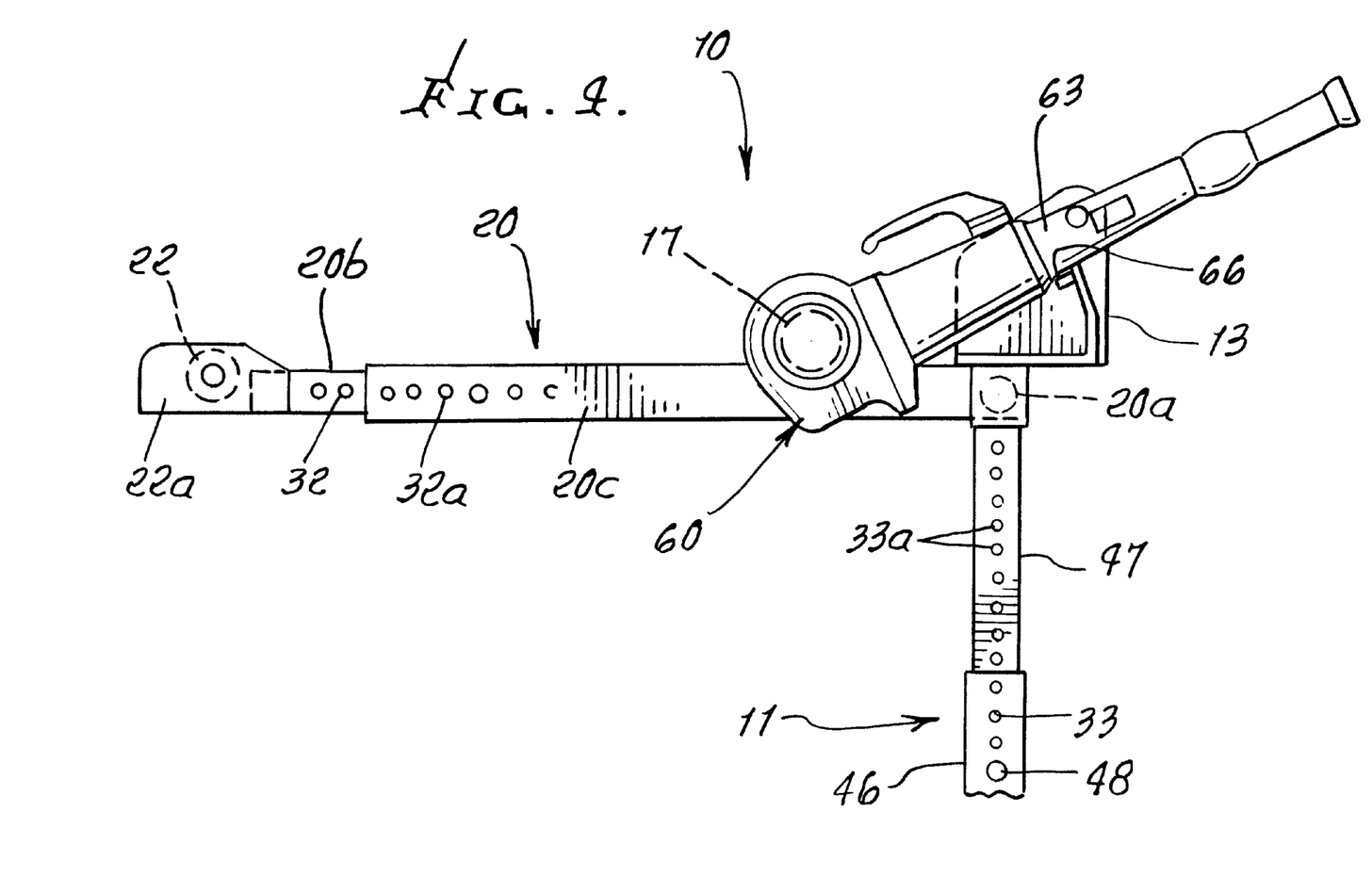
FIG. 4 is an enlarged side elevational view, like that of FIG. 2.
Figure 5:
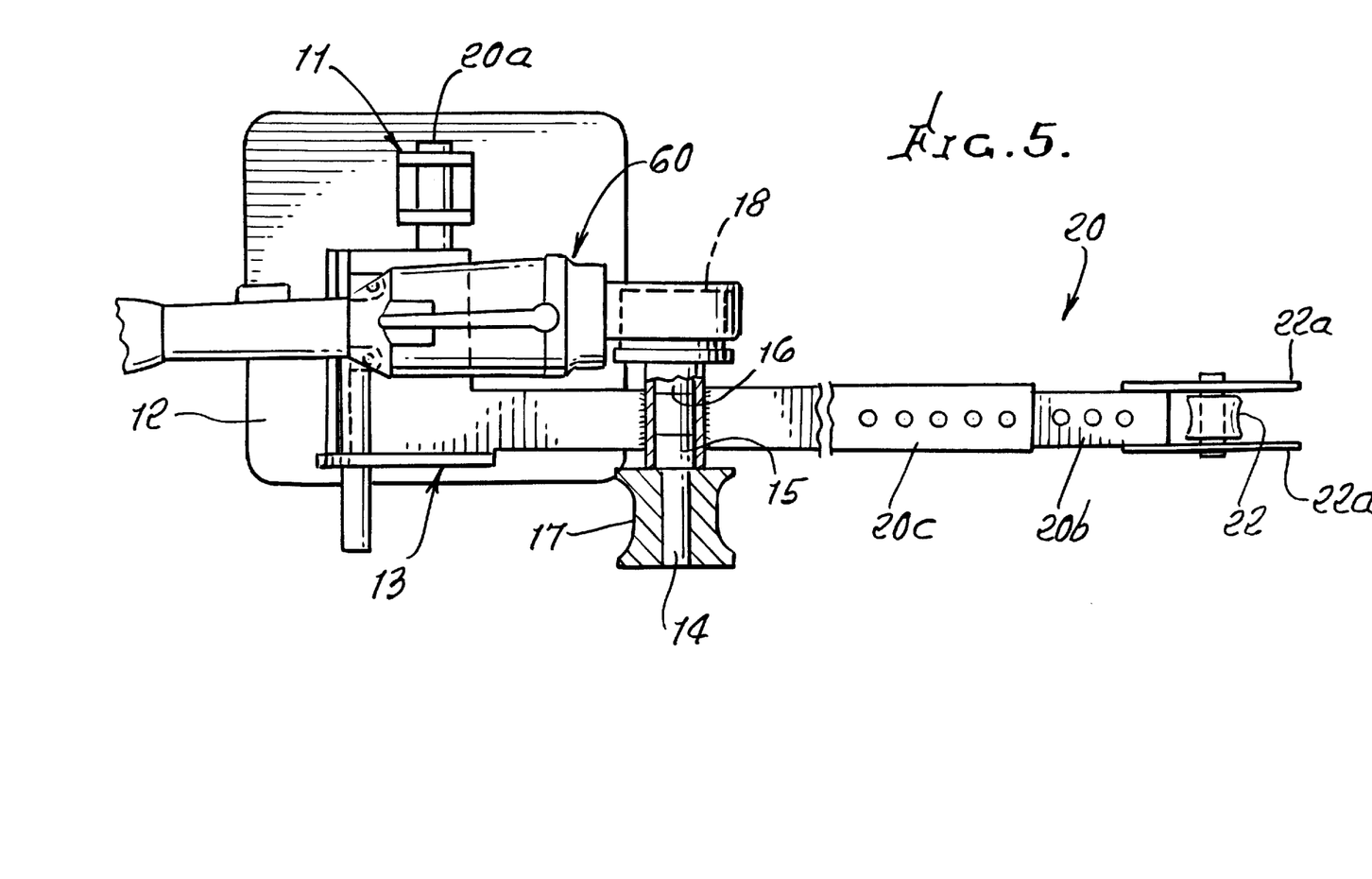
FIG. 5 is a top plan view showing details of the drive from the power tool to the wire pulling means.
Figure 6:
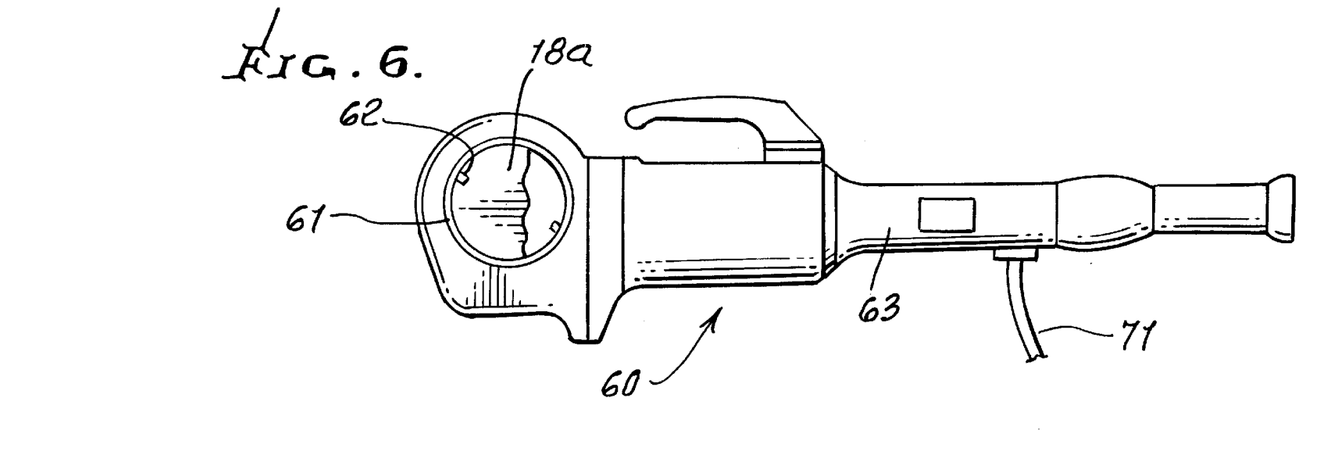
FIG. 6 is a side elevational view of a power driven tool, as employed in FIGS. 1 and 5.

Removable drive 60 for rotating the coupler or driver 18 includes a drive ring or annulus 61 (see FIG. 6) that axially interfits the drum 18a of 18 as the drive is mounted on the frame. Retainers 62 frictionally attach the drum to the ring. A stop 66 on the frame 13 blocks rotation of the housing 63 of the drive, about the lateral axis of axle 14, during reaction torque transmission to the housing as the ring 61 forcibly rotates the drum 18 and capstan 17. See FIG. 2.

A foot switch 70 is electrically connected as by cable 71 to the drive 60, and enables the operator to operate the capstan from the drive 60 so that both hands of the operator are freed for handling or pulling of the wire or cable spooling off the capstan. The apparatus as shown in FIGS. 1–14 may be regarded as preferred.

A clamp can, if desired, be employed to hold down the ON-OFF trigger at the drive, and would not be moved to change the starting or stopping of the drive between ON and OFF. That clamp would be mounted solely on the drive handle 60a, at location 60b remote from the frame 13.

The method of operation includes the steps
a) adjustably rotating the idler pulley about an axis extending in the direction of the boom, to selectively orient the direction of travel of the wire or cable approaching the idler, and
b) driving the capstan about its axis to pull the cable or wire toward the capstan, and over the idler pulley.

Additional steps include supporting the idler on the distal end portion of the boom, and presenting said distal end portion to conduit from which cable or wire is being pulled; and operating a pipe threader tool to drive the capstan.

A pipe.threader is operated to drive the capstan, and a foot operated switch is provided to control energizing of the pipe threaded tool, while manually pulling wire or cable off the capstan.

I claim:

1. A wire or cable pulling apparatus, comprising in combination:
   a) a stand including an upright pedestal and a base supporting the pedestal,
   b) a frame mounted on the pedestal,
   c) a rotary axle supported by the frame, and a wire or cable pulling capstan carried by the axle, there also being a coupler associated with the axle for coupling an electrically powered driving tool in rotary driving relation with the axle and capstan,
   d) a boom having one end carried by the frame, and an idler carried by the boom, for entrainment by the cable or wire being pulled in response to capstan rotation when the boon is in operating position, extending at a first angle relative to the frame,
   e) the boom having a stored position in which the boom extends at a second angle relative to the frame,
   f) and an angular position adjustment associated with the boom, whereby said idler can be adjustably positioned angularly, relative to said capstan, enabling pulling of the wire or cable from the idler, in different directions,
   g) said angular position adjustment includes telescopically interfitting boom members one of which carries the idler, and the other of which is carried by the frame,
   h) there being locking parts associated with said members, to lock them in selected adjusted positions,
   i) said locking parts including transverse openings in said members, and at least one element receivable in selected openings that are registrable in said selected adjustment positions.

2. The combination of claim 1 including a boom captivating device carried by a selected one from the group consisting of
   i) the base
   ii) the pedestal.

3. The combination of claim 2 wherein the boom includes adjustable members, one of which is adjustable into captivation by said device.

4. The combination of claim 3 wherein said idler is carried by said one member, and said members are lengthwise elongated and are lengthwise adjustable.

5. The combination of claim 1 including a stop on the frame to be engaged by said tool in response to torque transmission by the tool to the capstan, during wire and cable pulling.

6. The combination of claim 1 including said tool, and an ON-OFF switch remote from the tool said switch being engagable as by an operator's foot to shift the tool between ON-OFF positions, whereby the operator's hands are free for handling cable or wire spooling off the capstan.

7. The combination of claim 1 wherein the pedestal includes telescopically interfitting pedestal members, one of which is carried by the base, and the other of which carries the frame.

8. The combination of claim 7 including locking parts associated with said members, to lock them in selected adjusted positions.

9. The combination of claim 8 wherein said locking parts include transverse openings in said members, and at least one pin receivable in selected openings that are registrable in said selected adjustment positions.

10. The combination of claim 1 wherein the pedestal includes telescopically interfitting pedestal members, one of which is carried by the base, and the other of which carries the frame.

11. The combination of claim 10 including locking parts associated with said members, to lock them in selected adjusted positions.

12. A wire or cable pulling apparatus, comprising in combination:
   a) a stand including an upright pedestal and a base supporting the pedestal,
   b) a frame mounted on the pedestal,
   c) a rotary axle supported by the frame, and a wire or cable pulling capstan carried by the axle, there also being a coupler associated with the axle for coupling an electrically powered driving tool in rotary driving relation with the axle and capstan,
   d) a boom having one end carried by the frame, and an idler carried proximate the opposite end of the boom, for entrainment by the cable or wire being pulled in response to capstan rotation when the boom is in operating position, extending at a first angle relative to the frame,
   e) and including said tool having a body extending generally normal to an axis defined by said axle,
   f) the tool having an annular drive part defining a central opening through which said axle extends,
   g) and a stop on the frame to be engaged by said tool in response to torque transmission by the tool to the capstan, during wire and cable pulling,
   h) and including an angular position adjustment associated with the boom, whereby said idler can be adjustably positioned angularly, relatively to said capstan, enabling pulling of the wire or cable from the idler, in different directions,
   i) said angular position adjustment including telescopically interfitting boom members one of which carries the idler, and the other of which is carried by the frame,
   j) there being locking parts associated with said members, to lock them in selected adjusted positions,
   k) and wherein said locking parts include transverse openings in said members, and at least one pin receivable in selected openings that are registrable in said selected adjustment positions.

13. The combination of claim 12 wherein said angular adjustment includes structure having adjustment positions at 0°, 90°, 180°, and 270° relative to an axis defined by the boom.

* * * * *